US010588396B2

(12) United States Patent
Soley

(10) Patent No.: US 10,588,396 B2
(45) Date of Patent: Mar. 17, 2020

(54) SPORTS HYDRATION APPARATUS

(71) Applicant: Rick Soley, Orange (AU)

(72) Inventor: Rick Soley, Orange (AU)

( * ) Notice: Subject to any disclaimer, the term of this patent is extended or adjusted under 35 U.S.C. 154(b) by 0 days.

(21) Appl. No.: 16/098,385

(22) PCT Filed: Jun. 8, 2017

(86) PCT No.: PCT/AU2017/050572
§ 371 (c)(1),
(2) Date: Nov. 1, 2018

(87) PCT Pub. No.: WO2017/210743
PCT Pub. Date: Dec. 14, 2017

(65) Prior Publication Data
US 2019/0150598 A1 May 23, 2019

(30) Foreign Application Priority Data

Jun. 8, 2016 (AU) ................................ 2016902232

(51) Int. Cl.
*A45F 3/20* (2006.01)
*B67D 1/10* (2006.01)
(Continued)

(52) U.S. Cl.
CPC ................. *A45F 3/18* (2013.01); *A45F 3/16* (2013.01); *A45F 3/20* (2013.01); *B62J 9/00* (2013.01);
(Continued)

(58) Field of Classification Search
CPC .... A45F 2003/166; B67D 2210/00131; B67D 1/0888; B67D 1/10; B67D 1/0005; B67D 1/0004
(Continued)

(56) References Cited

U.S. PATENT DOCUMENTS 4,629,098 A * 12/1986 Eger .......................... A45F 3/16
138/115
4,801,088 A * 1/1989 Baker .................... B05B 9/0861
222/175
(Continued)

FOREIGN PATENT DOCUMENTS

CN 201879037 U 6/2011
WO 0197652 A1 12/2001

OTHER PUBLICATIONS

International Search Report & Written Opinion dated Sep. 7, 2017 from corresponding PCT Application No. PCT/AU2017/050572.

*Primary Examiner* — Justin M Larson
(74) *Attorney, Agent, or Firm* — Innovation Capital Law Group, LLP; Vic Lin

(57) ABSTRACT

There is provided a sports hydration apparatus comprising: electric componentry housing; an annulus rotatably coupled to the housing, the annulus defining peripheral exterior threading for engaging a threaded opening of a bladder such that the annulus can rotate relative to the housing to screwably engage the threaded opening and wherein the housing and annulus cooperate to seal the threaded opening when the annulus is screwed in; hydration hosing transitioning through the housing in a fluidtight manner, the hosing comprising an interior inlet hose portion which reaches within the bladder for drawing fluid and an exterior outlet hose; a mouthpiece and wherein the outlet hose reaches the mouthpiece; an electric pump coupled to the hydration hosing to pump fluid through the hosing; wherein the housing houses electric componentry comprising: a wireless receiver coupled to the pump and configured for receiving wireless instructions from a dispensing controller device to operate the pump.

25 Claims, 12 Drawing Sheets

(51) Int. Cl.
    *A45F 3/18*     (2006.01)
    *B62K 19/40*     (2006.01)
    *B62J 9/00*     (2020.01)
    *B62J 11/00*     (2020.01)
    *A45F 3/16*     (2006.01)
    *B62J 99/00*     (2020.01)
    *B67D 1/00*     (2006.01)
    *B67D 1/08*     (2006.01)
    *B62K 23/02*     (2006.01)

(52) U.S. Cl.
    CPC ............... *B62J 11/00* (2013.01); *B62J 99/00* (2013.01); *B62K 19/40* (2013.01); *A45F 2003/166* (2013.01); *B62K 23/02* (2013.01); *B67D 1/0004* (2013.01); *B67D 1/0005* (2013.01); *B67D 1/0888* (2013.01); *B67D 1/10* (2013.01); *B67D 2210/00131* (2013.01)

(58) Field of Classification Search
    USPC ........................................ 224/148.2; 222/175
    See application file for complete search history.

(56) References Cited

U.S. PATENT DOCUMENTS

| | | | | |
|---|---|---|---|---|
| 4,815,635 | A * | 3/1989 | Porter | B62J 11/00 222/136 |
| 4,911,339 | A * | 3/1990 | Cushing | B62J 11/00 222/401 |
| 5,201,442 | A * | 4/1993 | Bakalian | A45F 3/16 222/608 |
| 5,524,612 | A * | 6/1996 | Chen | A62B 18/086 128/200.29 |
| 5,564,605 | A * | 10/1996 | Heidbreder | A63B 55/00 222/192 |
| 5,571,260 | A * | 11/1996 | Krug | A45F 3/16 222/175 |
| 5,645,404 | A * | 7/1997 | Zelenak | A45F 3/16 222/175 |
| 5,709,478 | A | 1/1998 | Chen | |
| 5,984,145 | A * | 11/1999 | McAllister | A45F 3/16 222/175 |
| 6,145,695 | A * | 11/2000 | Garrigues | A42B 3/048 137/209 |
| 6,283,344 | B1 * | 9/2001 | Bradley | A42B 1/24 222/175 |
| 6,666,360 | B1 * | 12/2003 | Swank | A45F 3/20 222/175 |
| 6,755,047 | B2 * | 6/2004 | Kreutzmann | A42B 3/048 62/400 |
| 6,953,135 | B2 * | 10/2005 | Litton | B62J 9/001 224/414 |
| 8,113,389 | B2 * | 2/2012 | Lewis | A47K 5/1205 222/190 |
| 8,136,702 | B2 * | 3/2012 | Skillern | A45F 3/20 220/703 |
| 8,220,664 | B1 * | 7/2012 | Teetzel | A45F 3/20 222/175 |
| 8,371,474 | B2 * | 2/2013 | Tramontina | A47K 5/1205 222/1 |
| 8,453,893 | B2 * | 6/2013 | Shitaye | A45F 5/00 224/148.2 |
| 8,777,075 | B2 * | 7/2014 | Bretl | A45F 3/16 224/148.2 |
| 8,814,063 | B1 * | 8/2014 | Millan | A45F 3/18 239/289 |
| 9,296,001 | B2 * | 3/2016 | Carrozza | B05B 9/08 |
| 9,346,607 | B2 * | 5/2016 | Madjar | B65D 83/00 |
| 9,375,742 | B1 | 6/2016 | Yoked | |
| 9,792,409 | B2 * | 10/2017 | Wernow | G06F 19/3418 |
| 9,820,557 | B2 * | 11/2017 | Gottlieb | A45F 3/16 |
| 9,828,982 | B1 * | 11/2017 | Richardson | F04B 43/04 |
| 9,902,605 | B2 * | 2/2018 | Lux | B67D 1/10 |
| 9,919,324 | B2 * | 3/2018 | Carrozza | B05B 11/3057 |
| 9,924,781 | B2 * | 3/2018 | Kalalau | A45F 3/16 |
| 10,179,726 | B2 * | 1/2019 | Steele | A62B 18/086 |
| 10,351,441 | B2 * | 7/2019 | Robert | B01D 35/02 |
| 10,399,843 | B2 * | 9/2019 | Steele | B67D 1/0005 |
| 10,421,655 | B1 * | 9/2019 | Steele | B67D 1/1243 |
| 2004/0045980 | A1 * | 3/2004 | Robins | A45F 3/16 222/63 |
| 2006/0021999 | A1 * | 2/2006 | Jonjic | A45F 3/16 222/333 |
| 2011/0127291 | A1 * | 6/2011 | Tramontina | A47K 5/1205 222/52 |
| 2015/0014439 | A1 * | 1/2015 | Carrozza | B05B 9/08 239/172 |
| 2015/0182797 | A1 | 7/2015 | Wernow et al. | |
| 2016/0271635 | A1 | 9/2016 | Carrozza et al. | |
| 2018/0035787 | A1 * | 2/2018 | Jaeger | A42B 3/0406 |
| 2018/0035791 | A1 * | 2/2018 | Jaeger | A42B 3/0406 |
| 2018/0067504 | A1 * | 3/2018 | Jaeger | A42B 3/0406 |

* cited by examiner

SPORTS HYDRATION APPARATUS

FIELD OF THE INVENTION

This invention relates generally to sports hydration apparatus and, in particular, but not necessarily entirely to, electrically pumped sports hydration apparatus for use for sports including motocross and cycling.

BACKGROUND AND SUMMARY OF THE INVENTION

There is provided herein enhancements to sports hydration apparatus for hydration during sports including motocross, cycling and the like.

In accordance with a first embodiment, there is provided sports hydration apparatus which is configured for connecting to existing hydration bladders in a particular manner, especially the Camelbak™ type bladders having large threaded openings as a substantially shown in FIGS. 7-13.

In this regard, the sports hydration apparatus in accordance with this first embodiment comprises a componentry containing housing and a peripheral annulus rotatably coupled to the housing and hydration hosing passes through the housing from the interior to the exterior of the bladder to the mouth of the user.

As such, in use, the annulus may be rotated with respect to the housing so as to screw into the threaded opening of the bladder and wherein, when screwed in, the housing and the bladder co-operate to seal the opening of the bladder.

In accordance with this embodiment, the particular housing configuration provides a low profile form, wherein, in embodiments, comprises an exterior facing recess within which various electrical componentry is accommodated in a low profile manner substantially midway the threaded opening of the bladder.

Furthermore, the rotatable annulus allows the housing to remain static so as to thereby avoid twisting of the hosing.

Furthermore, for bladders comprising existing outlets, the present sports hydration in accordance with this embodiment does not interfere with such existing outlets and such existing outlets may be utilised simultaneously as an alternative manual fluid provision means. However, there is furthermore provided an embodiment of sports hydration apparatus as a substantially shown in FIG. 14 configured for engaging such existing outlets.

Various prior art has sought to provide bladder type sports hydration apparatus but none of which are directed to the present problems of convenient attachment to the large threaded openings of bladders, let alone the associated problem of hose twisting. For example, D2 (US 2004/0045980 A1 (ROBINS)) discloses a personal hydration system with pump. However, as can be especially seen from FIG. 3, the system of D2 utilises a peristaltic pump attached to the surface of the bladder which draws fluid from the existing outlet of the bladder.

Similarly, reference D5 (U.S. Pat. No. 9,375,742 B1 (YOKED) 28 Jun. 2016) discloses a motorised hydration system which, in embodiment, and referring to FIGS. 4 and 5 of D5 utilises a fluid containing bladder. However, these embodiments of D5 are similar to those disclosed in figure D2 in that D5 utilises an external pump which draws fluid from the existing outlet of the bladder and is therefore not directed to the present problems and furthermore does not teach or suggest the presently claimed solution.

Furthermore, D1 (US 2015/0014439 A1 (SPRUZZA LLC) 15 Jan. 2015) discloses a torpedo-shaped handlebar mounted water bottle but which is not related to the present configuration let alone problems.

Furthermore, D3 (U.S. Pat. No. 5,201,442 A (BAKALIAN) 13 Apr. 1993) discloses a sports hydration apparatus but which is similarly unrelated to the present configuration let alone problems.

Furthermore, D4 (US 2011/0127291 A1 (TRAMONTINA et al) 2 Jun. 2011) discloses a dispenser for dispensing and cleaning fluid which, albeit in an unrelated field, is similarly unrelated to the present configuration let alone problems.

Furthermore, D6 (US 2015/0182797 A1 (KATHRYN A. WERNOW, HOWARD L. WERNOW) 02) discloses an app controlled water bottle hydration system which is similarly unrelated of the present configuration let alone problems.

There is also disclosed herein sports hydration apparatus in accordance with further embodiments such as those which are substantially shown in FIGS. 15-17 comprising a water bottle valve arrangement for releasable interconnection with a male proboscis portion. As such, the valve arrangement allows the drawing of fluid from the water bottle when engaged to the male proboscis portion but wherein the bottle can be removed from the male proboscis and utilised in the normal manner.

In further embodiment, there is provided the utilisation of magnets for the purposes of squashing a bladder for assisting the expulsion of fluid therefrom as a substantially shown in FIG. 18.

In further embodiments, there is shown aspects relating to mouthpieces water jets as a subject shown in FIGS. 2-3 and, in embodiments, tongue operated mouthpiece water jets as a substantially shown in FIG. 5. There is also shown differing hydration hosing attachment mechanisms as is substantially shown in FIG. 4 and actuators as a substantially shown in FIGS. 5 and 6.

Furthermore, in embodiments, there is shown various control functionality of the controller system as a substantially shown in FIG. 1, in including dispensing, hydration, level control and the like.

It is to be understood that, if any prior art information is referred to herein, such reference does not constitute an admission that the information forms part of the common general knowledge in the art, in Australia or any other country.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
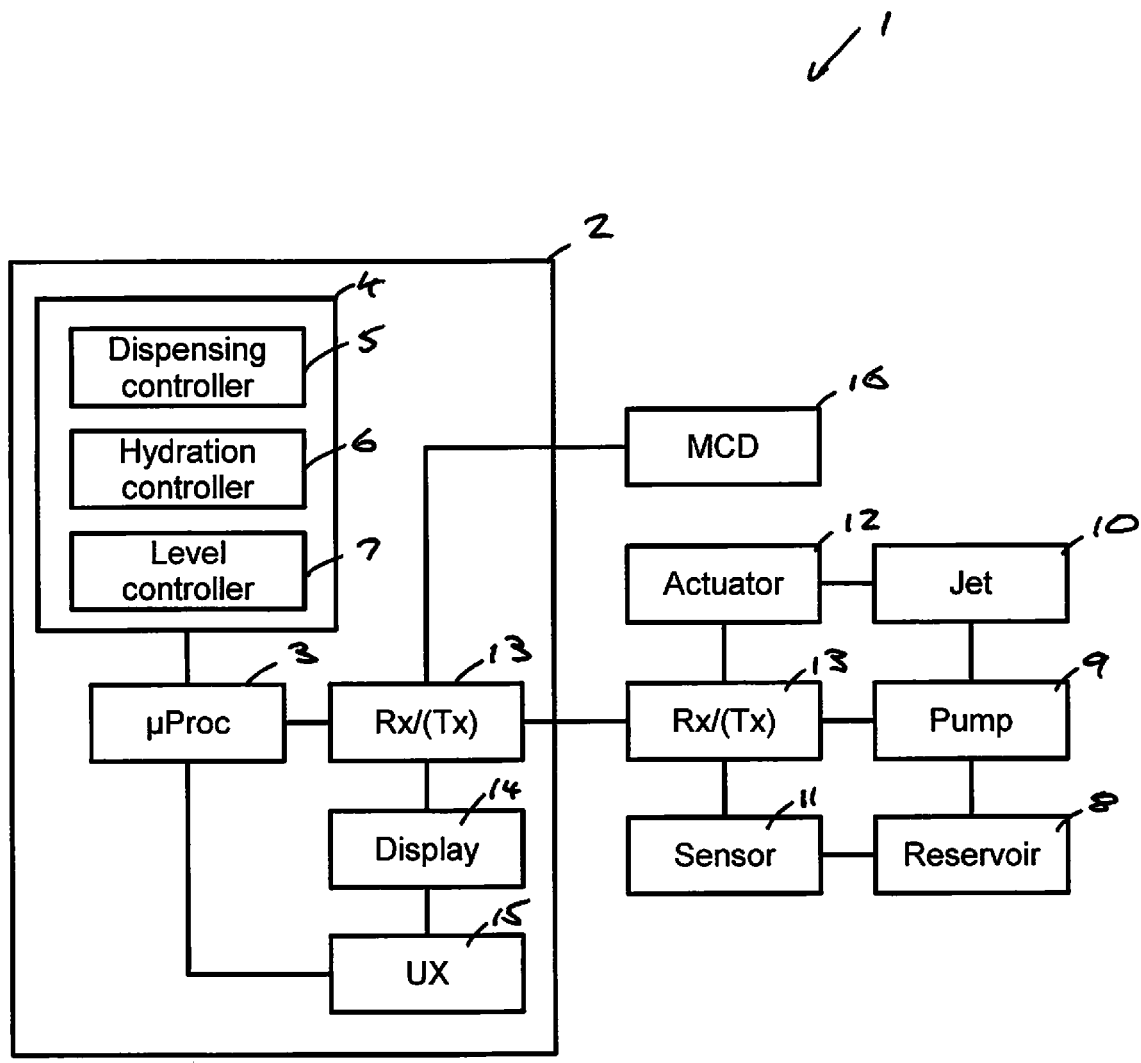
FIG. 1 shows a functional schematic of a microprocessor based sports hydration apparatus in accordance with an embodiment.

FIG. 1 shows sports hydration apparatus 1 in accordance with a first embodiment. The apparatus 1 comprises a controller device 2 which, in the embodiment shown, is a digital controller device comprising a microprocessor 3. In operable communication with the microprocessor 3 across a system bus is a memory device 4. The memory device is configured for storing digital data including computer program code. As such, in use, the microprocessor 3 may fetch, decode and execute these computer code instructions from the memory device 4. In the embodiment shown, the computer code instructions have been shown as having been divided into various computer code instruction modules which, in embodiments, may comprise a dispensing controller 5, hydration controller 6 and a level controller 7 as will be described in further detail below.

The apparatus 1 comprises a fluid containing reservoir 8 and furthermore an electric pump 9 operably coupled to the reservoir 8 so as to pump fluid therefrom for hydration purposes.

In embodiments, fluid is pumped via a jet 10 so as to avoid retention of a mouthpiece within the mouth.

In embodiments, the apparatus 1 may comprise a level or immersion sensor 11 in operable communication with the reservoir 8 so as to sense the level of fluid therein. The sensor 11 may act in unison with the level controller 7 so as to provide various level indications, warnings and the like to the user.

In further embodiments, the apparatus 1 may comprise a sensor/actuator 12 operably coupled to the mouthpiece or the like so as to allow for the user control the dispensing of fluid. In embodiment, the actuator 12 may take the form of the tongue operated actuator as is substantially shown in FIG. 5 wherein the user may utilise the user's tongue to depress the button to dispense fluid. In alternative embodiments, the actuator 12 may take the embodiment as is substantially shown in FIG. 6 wherein the device is handlebar mounted comprising a pushbutton for such purposes.

In embodiments, the controller device 2 comprises a transmitter and/or receiver 13 in operable communication with a corresponding transmitter and/or receiver 13 which controls the pump 9. In embodiments, such may be a wireless short range transceiver such as a Bluetooth transceiver. As such, the controller device 2 may send control instructions to the pump 9 for the dispensing of fluid and receive various control instructions, sensor data and the like.

In embodiments, the controller device 2 may comprise a display device 14, such as a digital display device, led display of the like for the display of various information. In embodiments, the controller device 22 may comprise an audible buzzer device so as to play out audible cue is for the user.

In further in embodiments, the controller device 2 may comprise a user interface 15 which, in embodiment, may take the form of a touch sensitive overlay overlaid the display 14 so as to receive haptic gestures from the user. In alternative embodiments, the user interface in 15 may take other forms, such as a pushbutton type user interface.

Furthermore, in embodiments, the controller device 2 may pair with a mobile communication device 16 so as to allow for the display of requisite information via the mobile communication device 16, receive control instructions from the mobile communication 16 and the like.

In use, the dispensing controller 5 may control the dispensing of fluid by controlling the operation of the pump 9. As such, when receiving control instructions via the actuator 12, the dispensing controller 5 may control the pump 9 accordingly. There are differing manners by which the dispensing controller 5 may control the pump 9. For example, in one embodiment, the dispensing controller 5 may control the operation of the pump only while receiving dispensing control instructions via the actuator 12. Alternatively, the dispensing controller 5 may control the pump 9 to pump fluid for a predetermined period after having received a control instruction from the actuator 12.

In alternative embodiments, the dispensing controller 5 may additionally control the flow rate of the dispensing of fluid by controlling the operational speed of the pump 9. For example, upon receiving one press of a pushbutton of the dispense controller 12, the dispensing controller 5 may dispense fluid at a first rate wherein alternatively, when receiving two presses of a pushbutton of the actuator 12, the dispensing controller may dispense fluid at a second faster rate and so on and so forth.

In embodiments, the hydration controller 6 may be configured for automated dispensing of fluid in accordance with a fluid replacement regime. For example, the user may configure the apparatus 1 to dispense 1L of fluid per hour. As such, the apparatus 1 would automate the adherence to such a regime. In embodiments, prior to the automated dispensing of fluid, the controller device 22 may output an audio cue or other indicator to the user so as to warn the user of the impending dispensing of fluid.

In embodiments, the hydration controller 6 may take into account various sensor variables so as to dynamically update the fluid replenishment regime. For example, for a fitness tracking software application executing on the mobile communication device 16, the controller device 2 may receive various parameters therefrom, such as distance traveled, elevation climbed, environmental variables such as ambient temperature, biometric variables such as heart rate, gender, age, weight and the like and the like so as to calculate for dynamically update the fluid replenishment regime and control the dispensing of fluid accordingly. As such, the greater the exertion of the user, the greater the amount of fluid dispensed by the hydration controller 6.

The level controller 7 may act in accordance with the sensor 8 to control various aspects of level control. For example, in one embodiment, the level controller 7 may determine whether or not the pump 9 is immersed within fluid in the first place so as to avoid dry operation of the pump 9.

Furthermore, the level controller 9 may determine the level of the fluid within the reservoir 8 so as to be able to provide indication of such to the user, or warn the user of the remaining amount of fluid left. In embodiments where in the hydration controller 6 dynamically calculates a hydration regime, the level controller 7 may indicate to the user the distance remaining for which fluid is available such as wherein, for example, the level controller 7 warns the user that fluid is only available for the next 10 km of cycling.

In embodiments, the level controller 7 may utilise both software and hardware control to determine or estimate the level of fluid within the reservoir 8.

For example, for software control level estimation, the level controller 7 may be reset upon refilling the reservoir 8 wherein the level controller 7 dynamically monitors the dispensing of fluid from the pump 9 in accordance with the pump operation time and pump rate if needs be. As such, the level controller 7 is able to dynamically calculate the remaining fluid within the reservoir 8. In embodiments, the sensors 11 may determine the amount of fluid within the reservoir 8 such that the level controller 7 is able to determine the amount of fluid remaining in accordance with sensor data received via the sensor 11.

Figure 2:
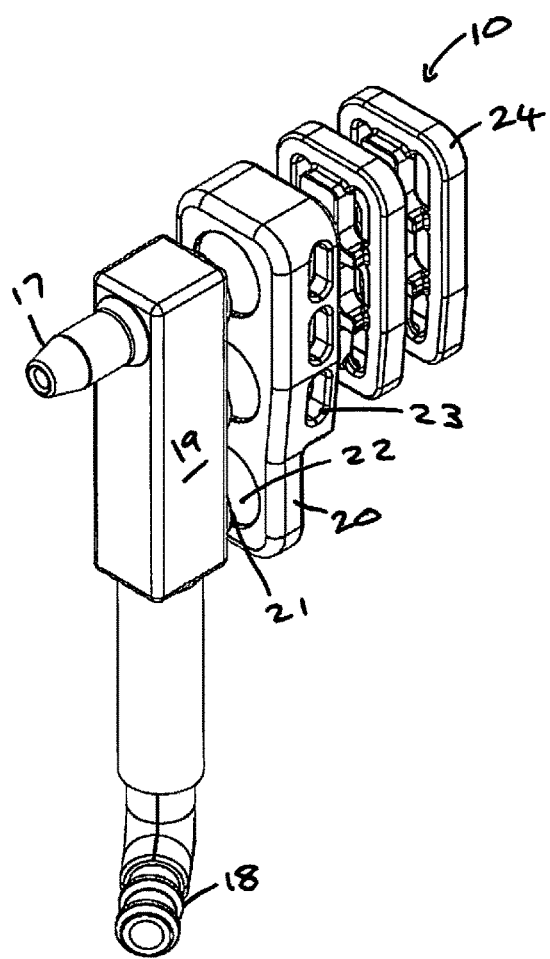
FIG. 2-3 show examples of helmet mounted fluid jet mouthpieces in accordance with an embodiment.

FIG. 2 shows a fluid dispensing jet 10. As alluded to above, the jet 10 is configured for location away from the mouth of the user so as to spray a jet of fluid into the mouth of the user so as to negate the utilisation of in mouth mouthpieces which may hamper breathing and the like especially during vigorous exercise.

As can be seen, the jet 10 comprises an outlet 17 which is directed towards the mouth of the user and an inlet 18 configured for coupling to the hydration hosing.

In the embodiment shown, the jet 10 comprises a detachable portion 19 which is releasably fastenable to a fixed portion 20. The fixed portion 20 may be fastened to a helmet or the like allowing for the selective attachment of the detachable portion 19 thereto. In the embodiment shown, the detachable portion 19 comprises magnets 21 and which may further locate within recesses 22. The fixed portion 20 may comprise transverse apertures 23 for passing cable ties and the like therethrough. Furthermore, the waterjet 10 may comprise spacers 24 for spacing the detachable portion 19 away from the helmet.

Other fastening mechanism may be utilised in lieu of magnets 21, such as hook and loop fasteners, mechanical interlock clip-type fasteners and the like.

Figure 3:
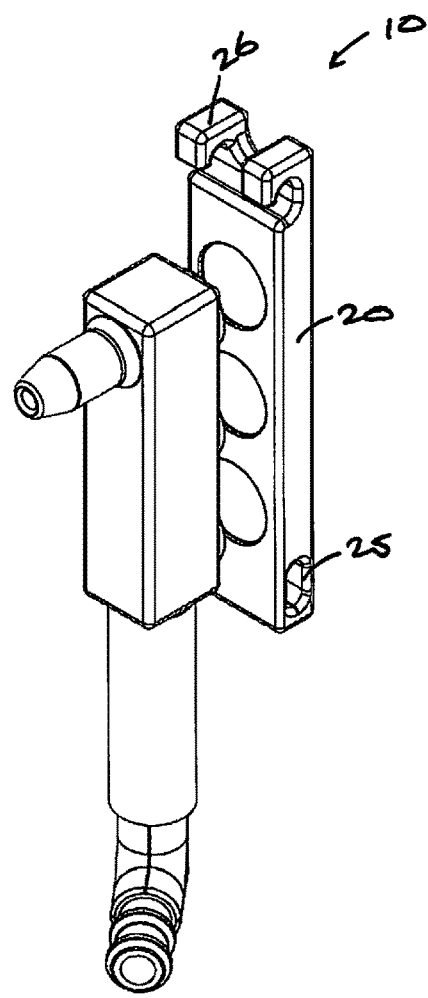

The waterjet 10 shown in the embodiment of FIG. 3 is configured for location within an interior surface of a helmet jaw piece. In this embodiment, the fixed portion 20 is configured for location against the inner surface of the jaw piece so as to face the mouth of the user. In this regard, the fixed portion 20 may comprise an inferior aperture through which an O-ring or other elastic type member is engaged for looping about the jaw piece and for selective engagement via superior catches 26.

Figure 4:
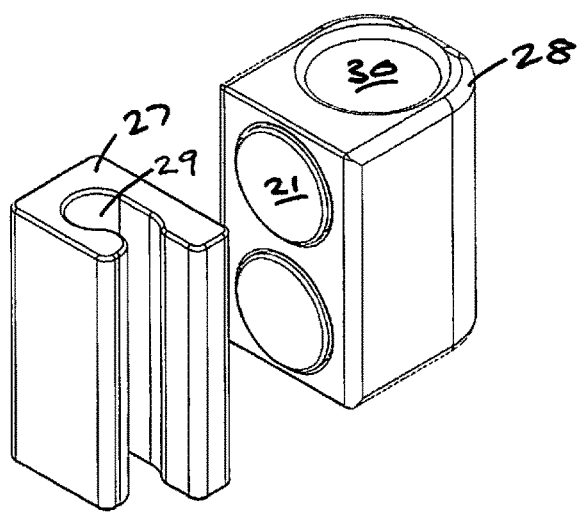
FIG. 4 shows a helmet affixable hydration hose engagement in accordance with an embodiment.

FIG. 4 shows a hose attachment mechanism comprising a helmet clip portion 27 and a hose engaging portion 28. As can be seen, the helmet clip portion 27 comprises a lengthwise recess 29 into which an edge of a helmet is inserted so as to fasten the helmet clip portion 27 to the helmet. In this regard, the hose engaging portion 28 may be selectively detachable from the proportion 27 again by way of magnets 21 or the like. The hose engaging portion 28 comprises a lengthwise aperture 30 through which the hydration hosing may be fed.

Figure 5:
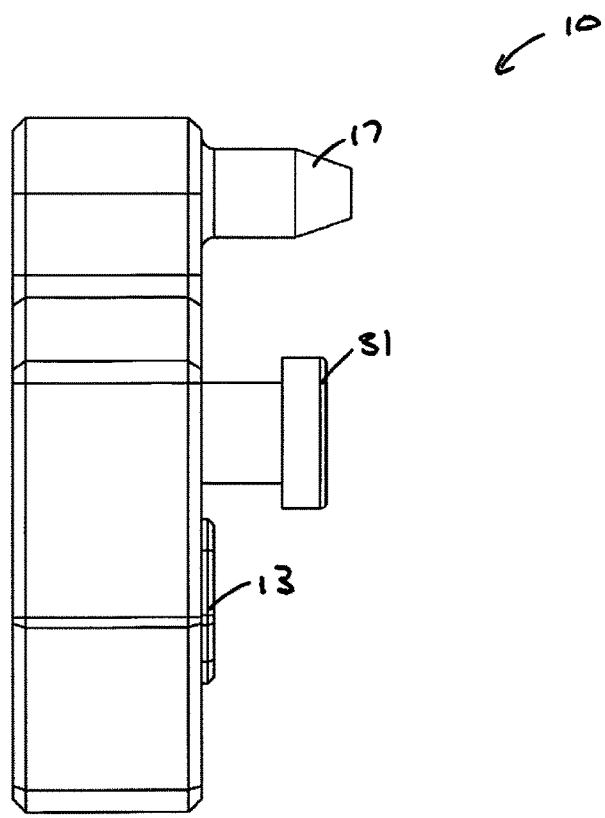
FIG. 5 shows an embodiment of a mouthpiece comprising a tongue operated actuator and wireless transmitter in accordance with an embodiment.

FIG. 5 shows an embodiment of the waterjet 10 wherein the waterjet 10 additionally comprises the sensor/actuator 12 for controlling the dispensing of fluid therefrom. In this regard, the waterjet comprises the outlet 17 directed towards the mouth of the user. However, the jet 10 in accordance with this embodiment further comprises a tongue operated pushbutton 31 which is depressed by the user's tongue for dispensing of fluid. In embodiments, the apparatus 1 may be configured to dispense fluid while the pushbutton 31 is depressed. However, in other embodiments the apparatus 1 may dispense fluid for a predetermined period after the pushing of the pushbutton 31.

In embodiment, the jet 10 may further comprise the receiver and/or transmitter 13 operably coupled to the pushbutton 31 so as to allow for the wireless conveyance of the control instruction to the remotely located controller device 2. In embodiments, other actuators may be utilised in lieu of the pushbutton 31, such as electric contacts sensors and the like. In embodiments, a microphone may be utilised to receive voice instructions and wherein the controller device 2 comprises a voice recognition software module such that the user is able to verbalise dispensing control instructions, including control instructions dictating the amount of fluid to dispense and the like.

In embodiments, a plurality of reservoirs 8 may be utilised comprising for example, water and isotonic reservoirs wherein, in use, the user is able to control the dispensing of the different types of fluid. In accordance with this embodiment, the dispensing of different type of fluids may be controlled by the user, either by utilising the actuator 12 such as by way of pushbutton or voice activation or alternatively in an automated manner wherein, for example, the hydration controller 6 dispenses either water or isotonic fluid in accordance with a hydration regime, including a dynamically calculate a hydration regime.

Figure 6:
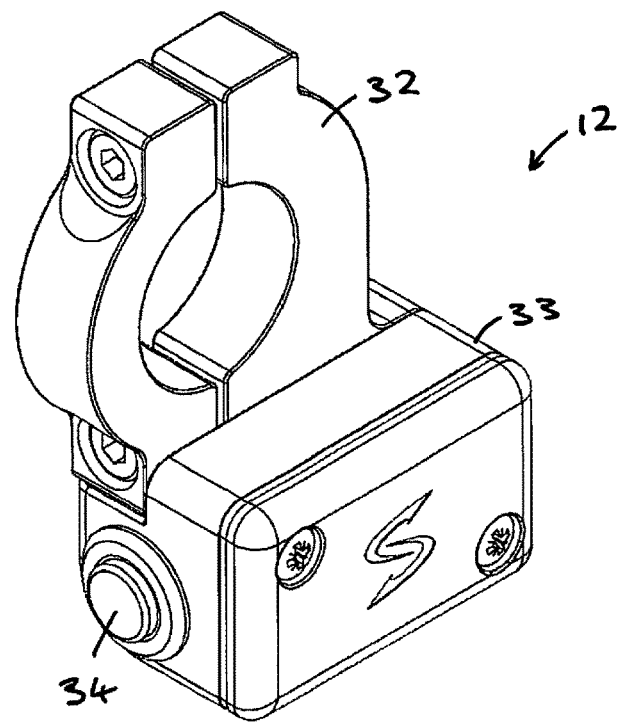
FIG. 6 shows an example of a handlebar mountable actuator in accordance with an embodiment

FIG. 6 shows an embodiment wherein the actuator 12 is handlebar mounted. In this embodiment, the actuator 12 comprises a bifurcated ring 32 for engagement around a handlebar or the like. Furthermore, the actuator 12 comprises a housing 33 comprising various componentry therein, including the transmitter and/or receiver 13. The housing 33 exposes a pushbutton 34 which is selectively depressed by the user for the dispensing of fluid.

FIG. 7-13 show an embodiment of sports hydration apparatus 35 configured for engaging a particular type of threaded opening 36 of a fluid containing bladder 37. As alluded to above, the bladder 37 and associated threaded opening 36 may take the form of commonplace Camelbak™ type bladders wherein the existing cap may be removed and substituted with the present sports hydration apparatus 35.

Figure 10:
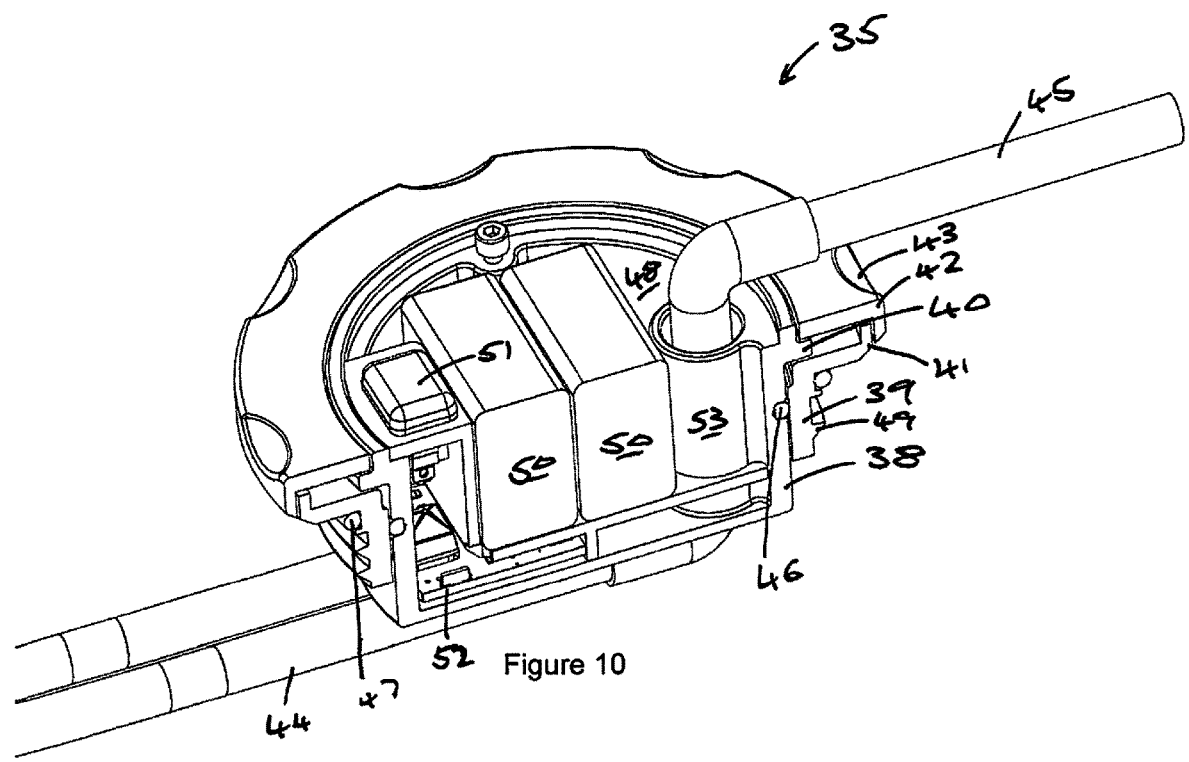

FIG. 10 shows a cross-section of the apparatus 35. As can be seen, the apparatus 35 comprises a housing 38 comprising various componentry. Furthermore, the apparatus 35 comprises an annulus 39 which is rotatably coupled to the housing 38. Specifically, as can be seen, in the embodiment shown, the housing 30 defines a peripheral flange 40 and wherein the annulus 39 comprises an inferior portion 41 and a superior portion 42 configured to engage either side of the flange 40 so as to allow the rotation of the annulus 39 about the housing 38. The superior portion 42 may define a grip 43 to facilitate rotation of the annulus 39.

Figure 7:
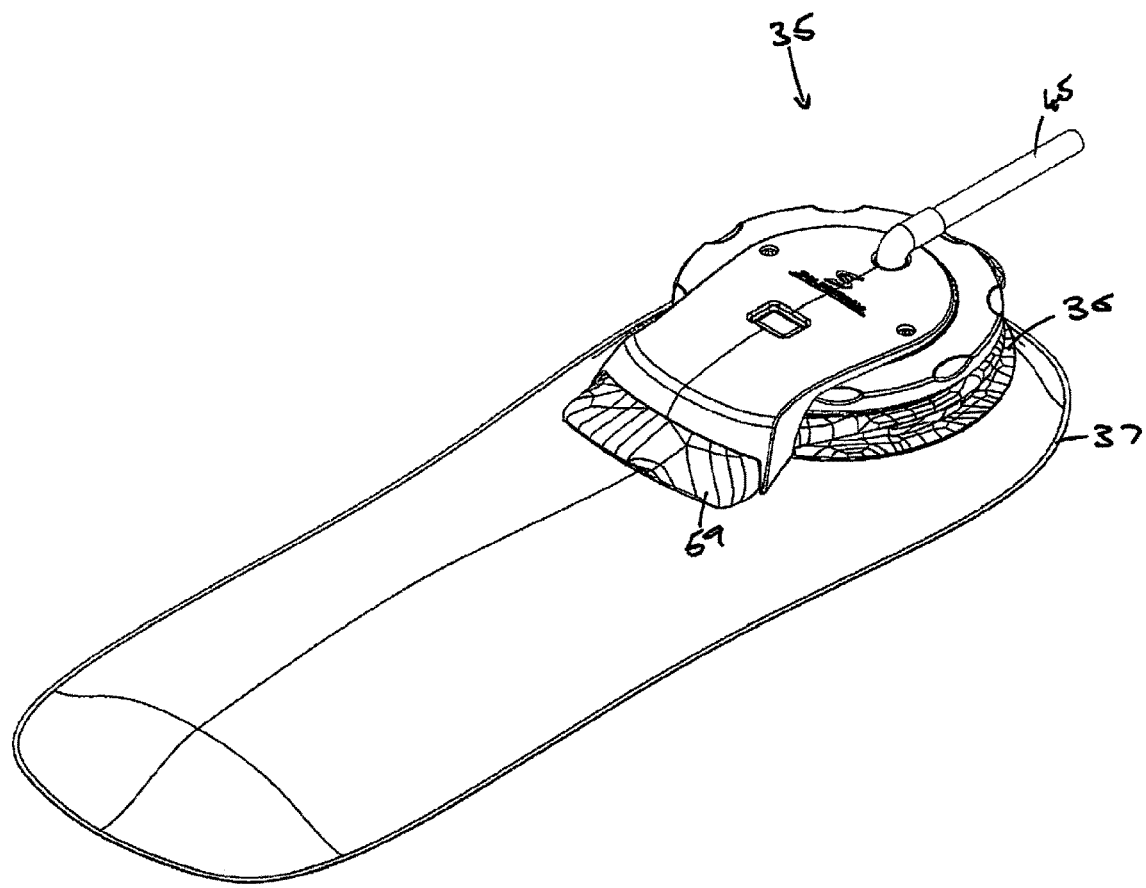
FIGS. 7-13 show an embodiment wherein the sports hydration apparatus is configured for engaging a particular type of bladder.

The apparatus 35 further comprises hydration hosing passing through the housing 38. Specifically, the hosing comprises an inlet hose portion 44 configured for location within the interior of the bladder 37 so as to draw fluids there from. In the embodiment of FIG. 7 wherein the bladder 37 is substantially elongate, the inlet hose portion 44 is configured to reach the bottom of the bladder 37 when upright so as to be able to draw substantially all of the fluid therefrom. Furthermore, the hydration hosing comprises an exterior hose portion 45 which leads to the jet 10, mouthpiece or the like.

As such, for the engagement of the apparatus 35, the existing cap of the bladder 37 would be removed and wherein the housing 30 would be located within the threaded opening 36 of the bladder 37. Thereafter, the annulus 39 would be rotated clockwise with respect to the housing 38 so as to screw into the complimentary threading of the threaded portion 36 until such time that the annulus 39 is screwed in wherein the housing 38 and the annulus 39 cooperate to seal the threaded opening 36.

In the embodiment shown, the apparatus 35 comprises an O-ring 46 which seals between the housing 38 and the annulus 39. Furthermore, an exterior O-ring 47 may be provided to seal between the annulus 39 and the threaded opening 36.

As can be seen especially from FIG. 10, the housing 39 is itself substantially circular in cross-section so as to be suited for accommodation within the circular opening of the threaded opening 36. Furthermore, the housing 38 is substantially cup-shaped so as to define an exterior facing recess 48 within which various componentry may be inserted.

As can be appreciated from the embodiment shown, the threading 49 of the annulus 39 may be substantially midway the depth of the recess 48 such that the componentry located within the recess 48 is accommodated substantially midway the threaded opening 36. In this way, the configuration of the housing 30 provides a low profile and convenient accommodation of the various componentry of the apparatus 35.

In the embodiment shown, the apparatus 35 may comprise battery packs 50 located within the recess 48. Furthermore, a pushbutton 51 may be exposed at the rim of the recess 48. The pushbutton 51 may be utilised for turning the apparatus 35 on and off and wherein the dispensing of fluid therefrom may be controlled via the actuator 12.

The recess 48 may further comprise various electronics such as which may be located on a PCB 52 such as by comprising the various componentry of the control device 2 as a substantially shown in FIG. 1.

Furthermore, the housing 38 may define a passage 53 through which the hydration hosing passes.

Figure 9:
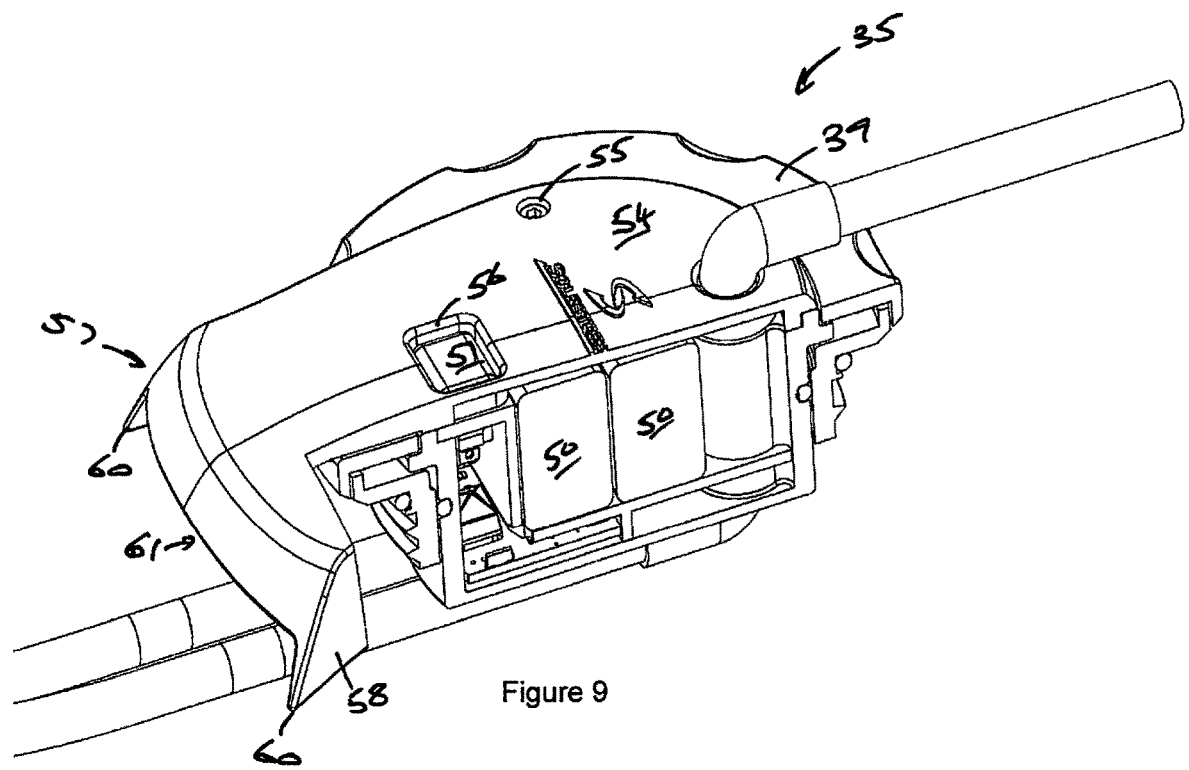

FIG. 9 shows the apparatus 35 further comprising a covering 54 which covers the opening of the recess 48. The covering 54 may be attached to the housing 38 by way of screw type fasteners 55.

As can be seen, the covering 54 may define an aperture 56 for access to the operational pushbutton 51.

Furthermore, in embodiment, the covering 55 may extend to define a handle portion 57. The handle portion 57 may be held to provide purchase when rotating the annulus 39. Specifically, lateral edges 58 of the handle portion 57 may be gripped between the fingers of one hand while the other hand screws the annulus 39.

However, reference is made to FIG. 7 wherein it is shown that the conventional threaded opening moulding 37 of conventional Camelbak™ type devices comprise a tongue portion 59 extending inferiority from the opening. As such, and returning to FIG. 9, the handle portion 57 comprises lateral wings 60 which defines a passage 61 therein to accommodate the tongue portion 59. As such, when located over the tongue portion 59, the covering 54 is held in place so as to allow the rotation of the annulus 39.

Figure 8:
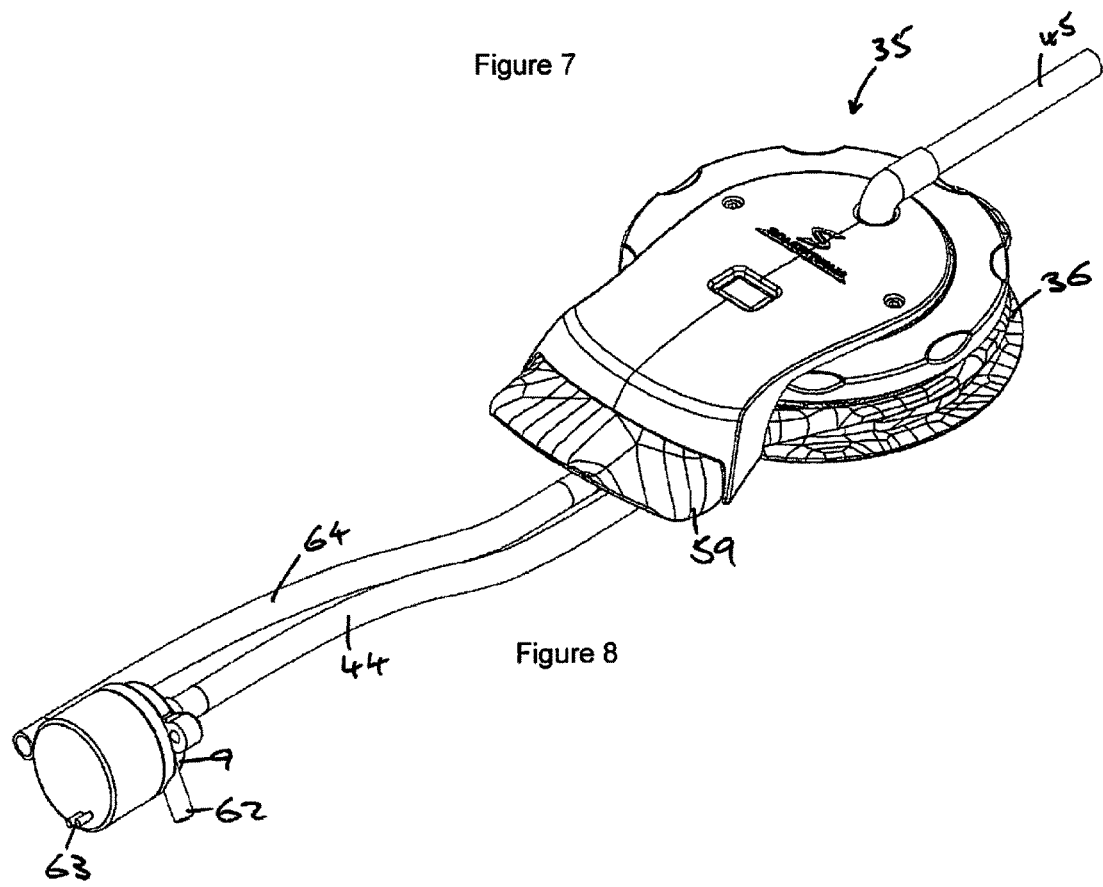

In the embodiment shown in FIG. 8, there is shown the inlet hose portion 44 comprising a pump module 9 at the distal end thereof. The pump module 9 comprises an inlet 62 which, in embodiments, may comprise an elbow spigot or the like so as to reach the bottom of the bladder 37 so as to draw substantially all of the fluid therefrom.

Figure 11:
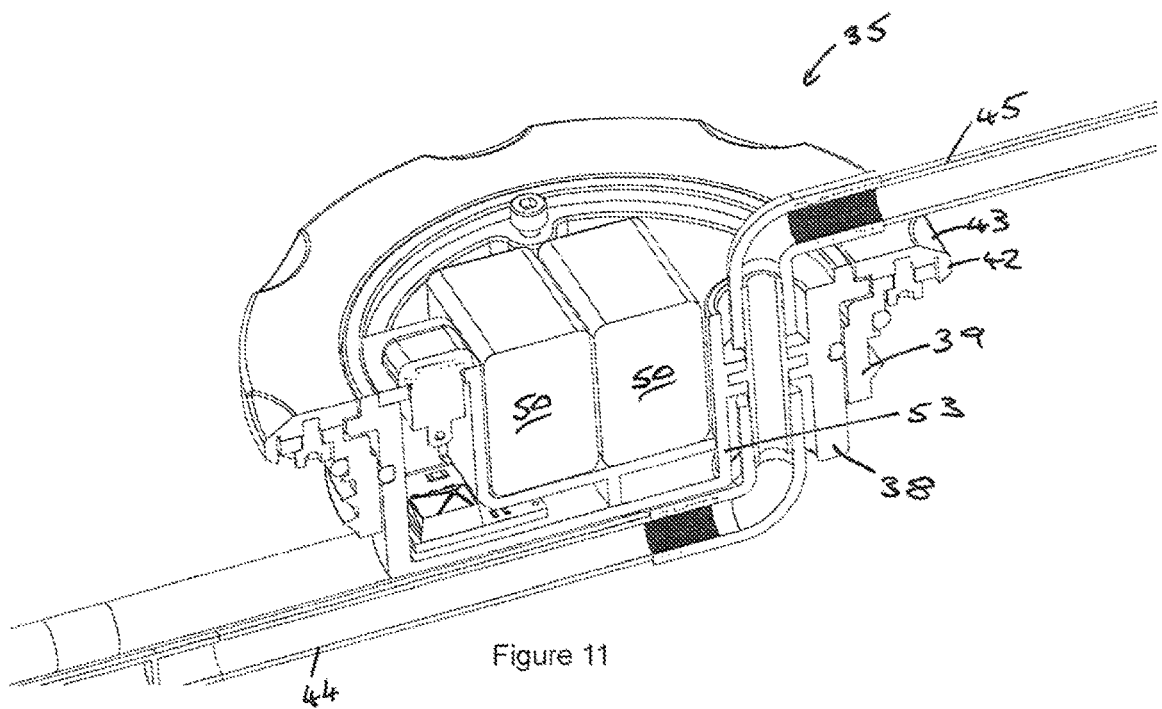
Figure 12:
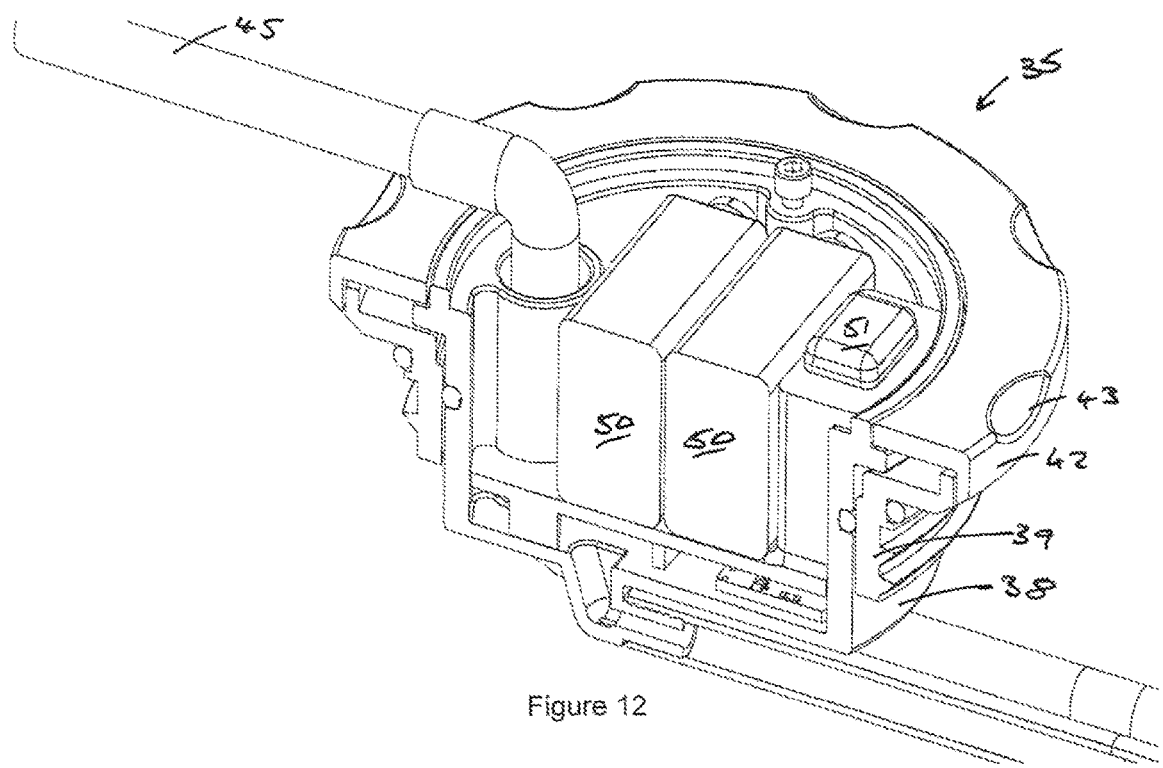
Figure 13:
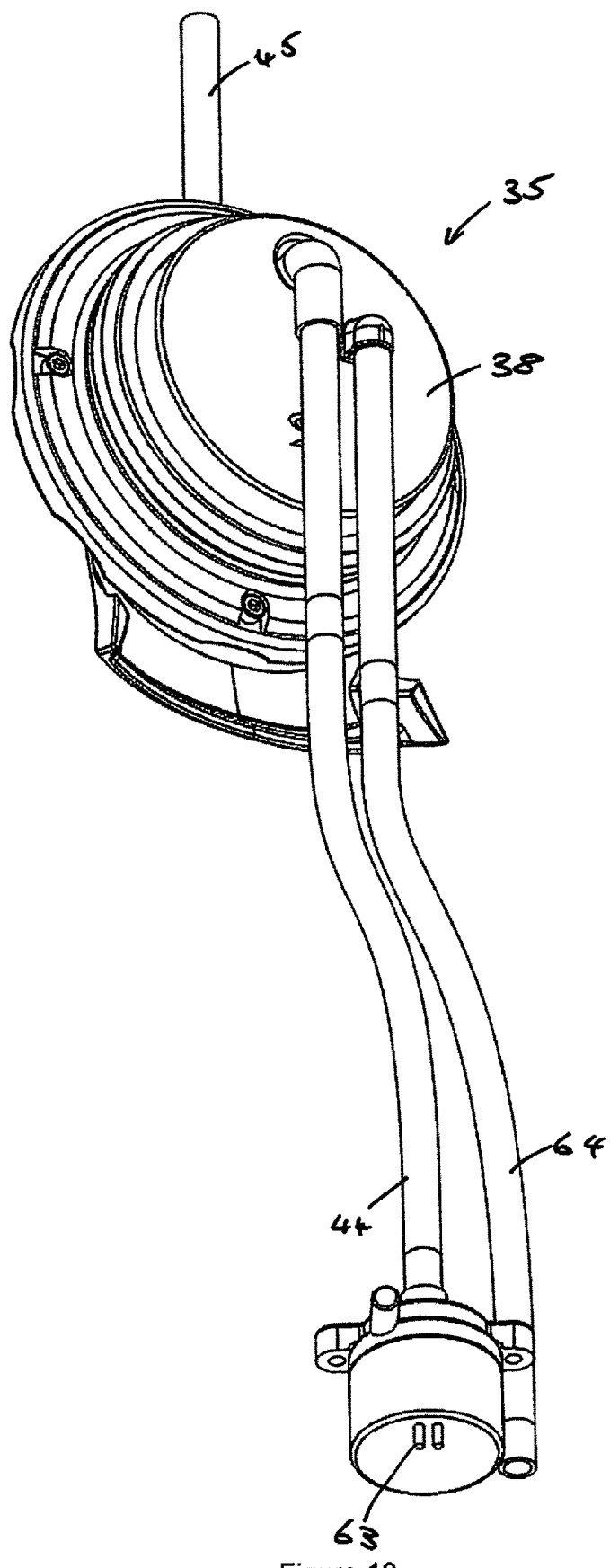

In embodiments, the pump module 9 may further comprise electric contact fluid level sensors 63 at a lower edge thereof so as to detect immersion within fluid prior operating. As such, when activated, and as is better illustrated in FIG. 11 shown a cross-sectional view of the hydration hosing, the pump module 9 pumps fluid from within the bladder 37 via the inlet 62 and via the inlet hose portion 44 via the housing 38 and via the outlet hose portion 45 to the jet 10.

In embodiments, an electric supply umbilical 64 may be supplied to provide fluid tight electrical conductivity for the pump module 9. Specifically, electric power supply, sensor cables and the like may be reticulated within the electric supply cable 64.

Figure 14:
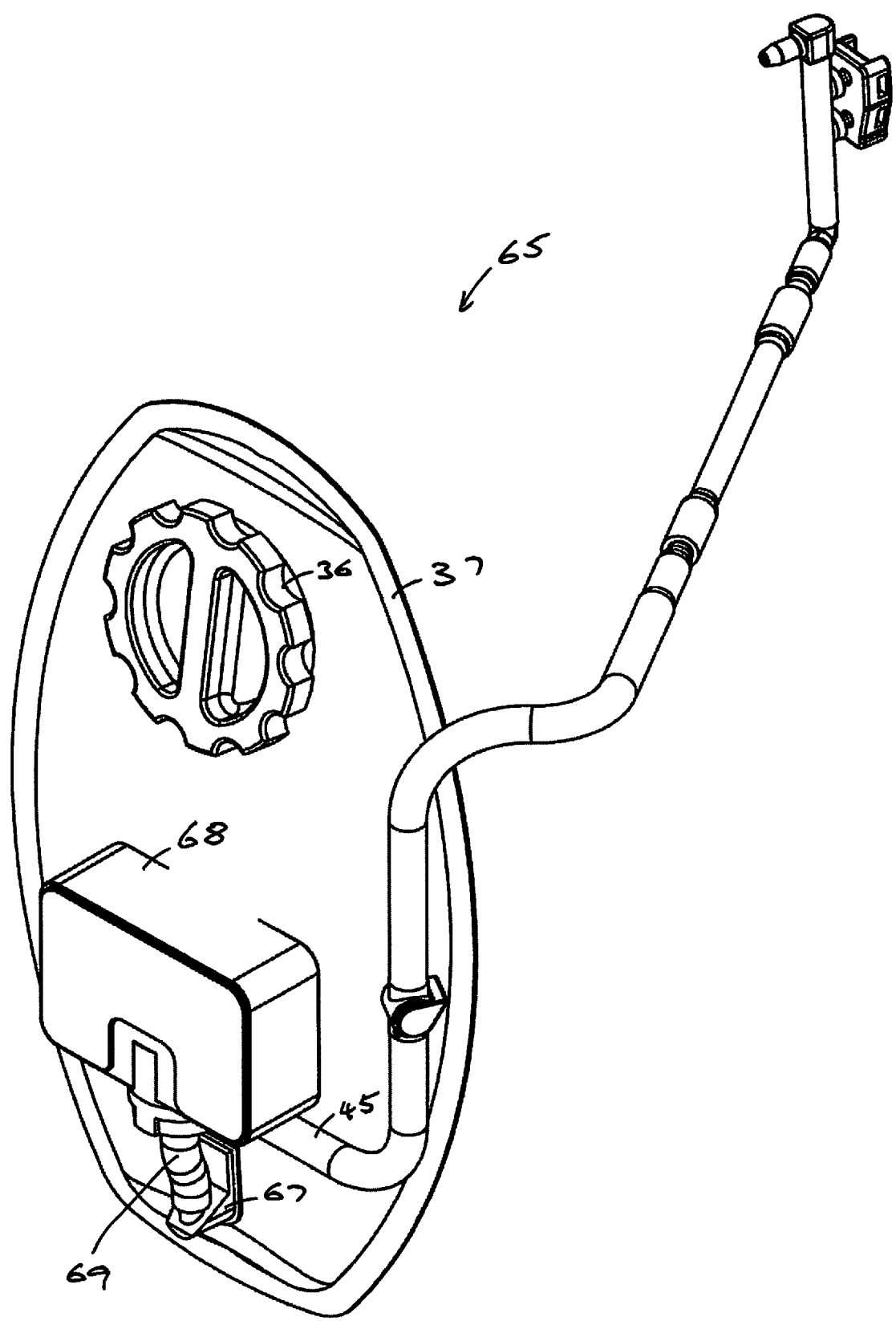
FIG. 14 shows an embodiment wherein the hydration system is configured for engaging an existing outlet of a bladder.

FIG. 14 shows an embodiment of sports hydration apparatus 65 which utilises an existing outlet 67 of an existing bladder 37 as opposed to the threaded opening 36.

As can be seen, in this embodiment, the apparatus in 65 comprises a housing 68 which is attached or located against the surface of the bladder 37 and comprises an inlet hose 69 operably coupled to the outlet 67 of the bladder 37. The housing 68 may comprise the various componentry, such as the pump, controller 2 componentry and the like including the receiver 13 so as to receive control instructions from the controller device 12. As such, when receiving a control instruction, the pump 9 within the housing 9 draws fluid from the inlet hose 16 via the outlet hose portion 45.

Figure 15:
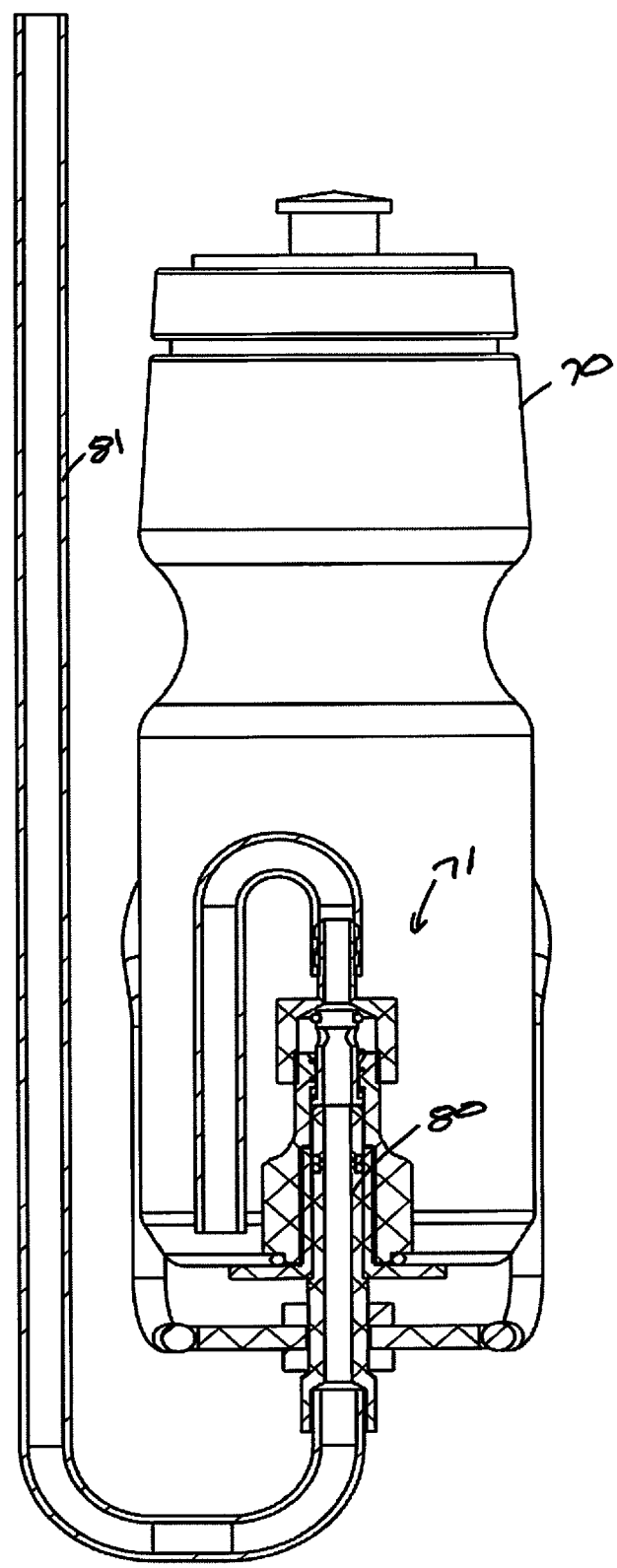
FIGS. 15-17 show a female-type valve for a water bottle allowing drawing a fluid therefrom when engaged within a bracket yet allowing for the removal therefrom for utilisation in the normal manner.

FIG. 15 shows an embodiment of a water bottle 70 female-type valve 71 which allows the drawing of fluid from the water bottle 70 from the base thereof while yet allowing the removal of the water bottle 70 and the utilisation thereof in the normal manner.

Figure 16:
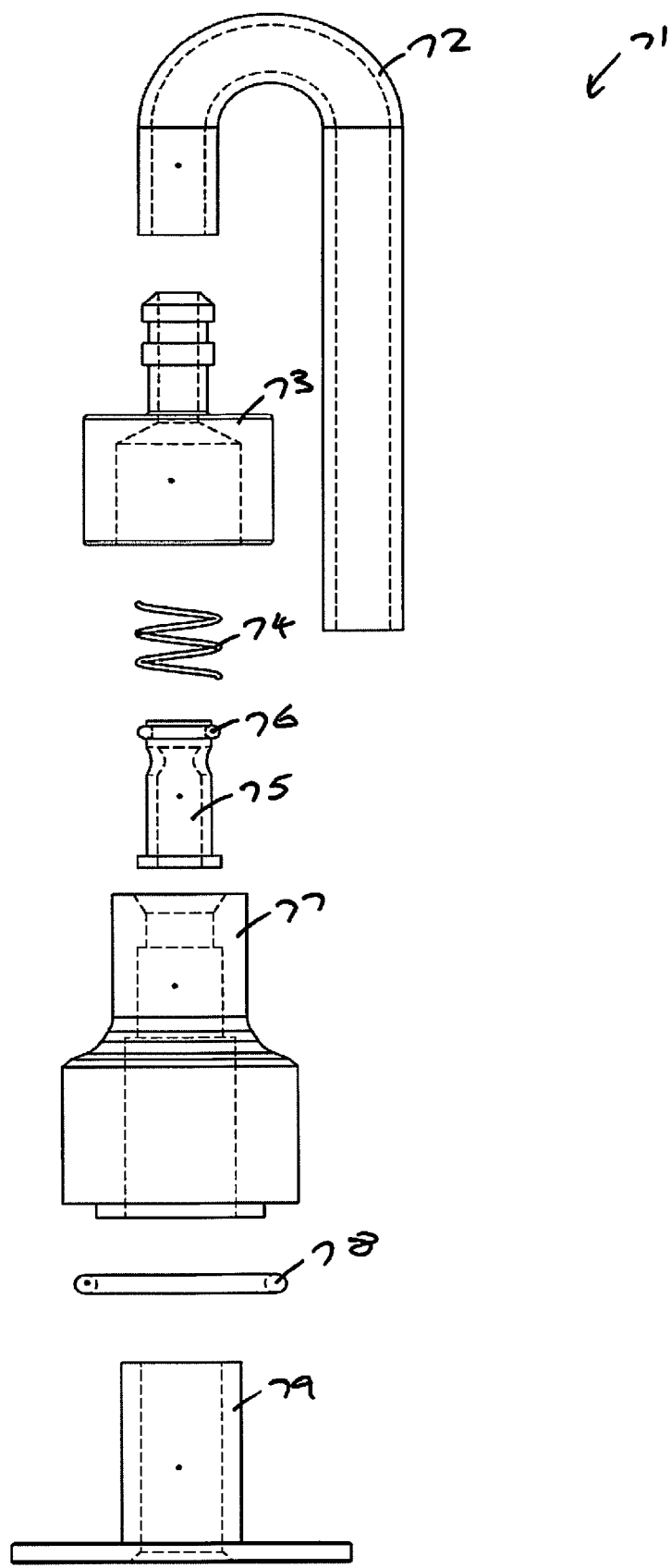

FIG. 16 shows the female-type valve 71 in further detail comprising a pickup spigot 72, pickup adapter 73, valve spring 74, valve 75 and associated O-ring 76, and further a bottle inner base 77, base O-ring 78 and a bottle outer base 79.

As is shown in FIG. 15, a male-type proboscis portion 80 inserts within the female type valve 71 so as to draw fluid from the interior of the water bottle 71. However, when required to be utilised in the normal manner, the water bottle 71 may be pulled from the proboscis portion 80 and utilised in the normal manner wherein the female-type valve 71 seals.

Specifically, the distal end of the proboscis portion 80 displaces the valve 75 upwardly when inserted within the female type valve 71 so as to move the associated O-ring 76 away from the bottle inner base 77 so as to allow fluid to flow through the valve 75. However, when the proboscis 80 is removed from the female type valve 71, the valve spring 74 displaces the valve 75 downwardly such that the associated O-ring 76 engages against the edge of the bottle inner base 77 so as to seal the female type valve 71.

Figure 17:
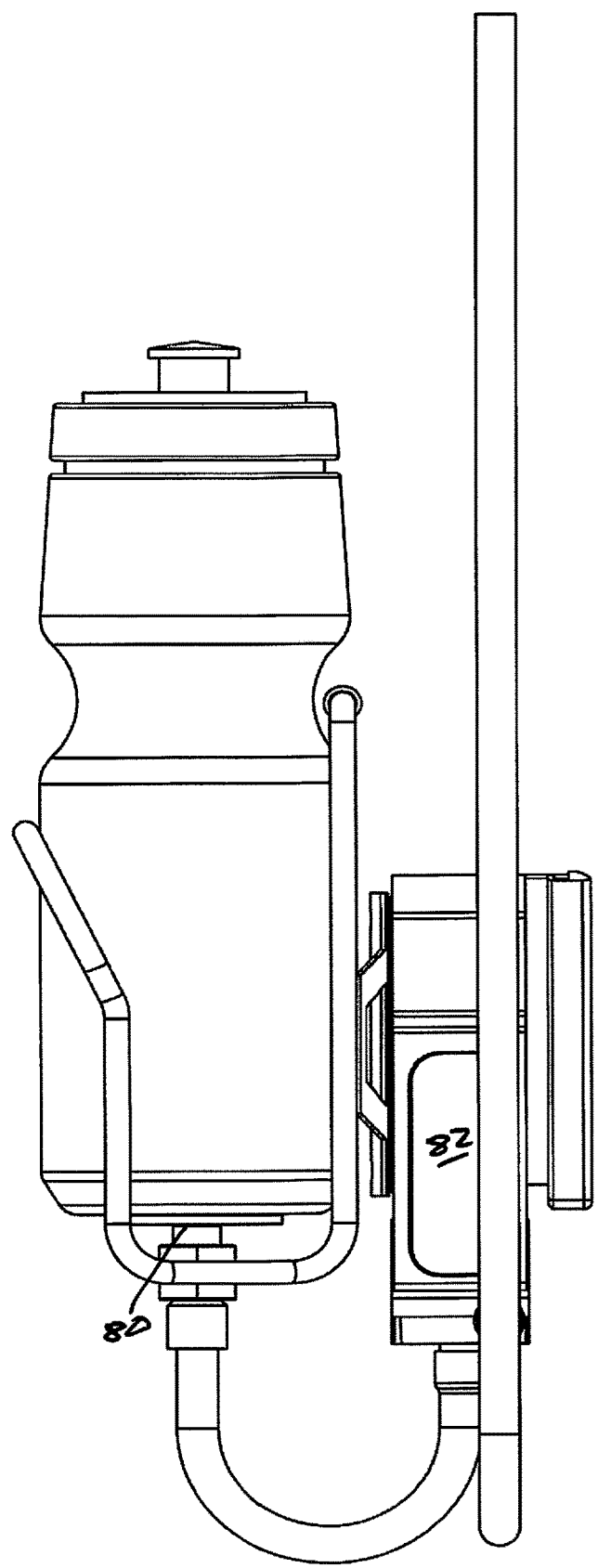

The embodiment shown in FIG. 15 represents a potential manually operated version wherein fluid may be sucked via associated hydration hosing 81 manually. However, the embodiment shown in FIG. 17 shows an automated version wherein the hydration hosing, operably coupled to the proboscis portion 80, feeds into a housing 82 comprising the requisite componentry including the pump 9.

Figure 18:
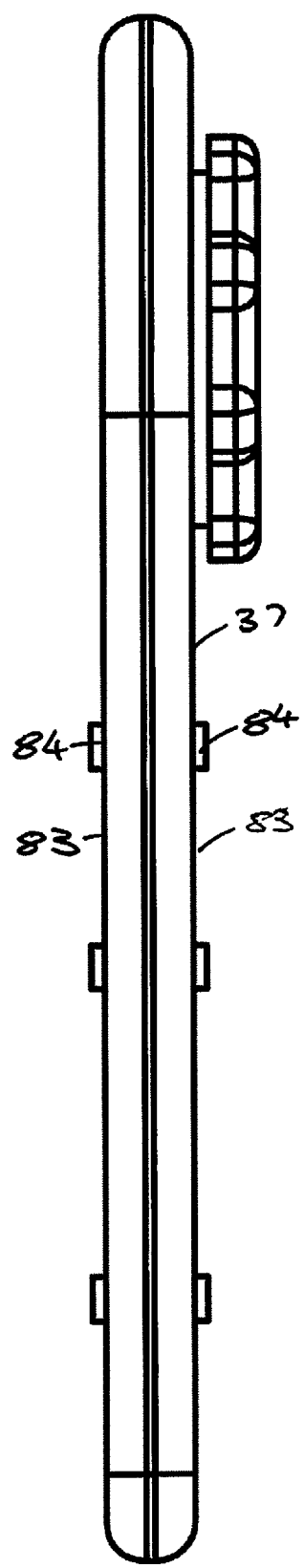
FIG. 18 shows an embodiment wherein a matrix of attractive magnets are utilised for squashing a bladder so as to enhance the expulsion of fluid therefrom.

FIG. 18 shows an embodiment wherein opposing surfaces 83 are provided with a matrix of respectively attracting magnets 84. As such, the attraction between the magnets pulls the walling of the ladder 37 together so as to assist in the squashing of fluid from the interior of the bladder 37.

In embodiments, the magnets 84 may be located on the respective surfaces 83 of the bladder 37 in a matrix type grid formation such that, when fluid begins to be depleted from the bladder 37, the peripheral magnets initially provide the strongest attraction so as to initiate the squeezing of fluid wherein, as further fluid is removed from the interior of the bladder 37, attraction of the more central magnets 84 comes into play.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. Sports hydration apparatus comprising:
   electric componentry housing;
   an annulus rotatably coupled to the housing, the annulus defining peripheral exterior threading for engaging a threaded opening of a fluid containing bladder such that, in use, the annulus is able to rotate with respect to the housing to screwably engage the threaded opening and wherein the housing and the annulus cooperate to seal the threaded opening when the annulus is screwed in;
   hydration hosing transitioning through the housing in a fluidtight manner, the hosing comprising an interior inlet hose portion which reaches within the bladder for drawing fluid therefrom and an exterior outlet hose;
   a mouthpiece and wherein the exterior outlet hose reaches the mouthpiece;
   an electric pump operably coupled to the hydration hosing to pump the fluid through the hydration hosing; and
   wherein the housing houses electric componentry comprising:
      a wireless receiver operably coupled to the electric pump, the wireless receiver configured for receiving wireless control instructions from a dispensing controller device to selectively operate the electric pump.

2. Sports hydration apparatus as claimed in claim 1, further comprising an O-ring between the housing and the annulus.

3. Sports hydration apparatus as claimed in claim 1, wherein the housing is substantially cup-shaped defining an exterior facing recess and wherein the electronic componentry is located within the recess.

4. Sports hydration apparatus as claimed in claim 3, wherein the peripheral exterior threading of the annulus is located substantially midway the depth of the recess such that the electronic componentry is located midway the threaded opening.

5. Sports hydration apparatus as claimed in claim 1, further comprising a covering fastenable to the housing for covering the recess.

6. Sports hydration apparatus as claimed in claim 5, wherein the covering defines a lateral extending handle portion.

7. Sports hydration apparatus as claimed in claim 6, wherein the handle portion comprises substantially perpendicular edges defines an inferior accommodation for engaging about a tongue portion of the threaded opening.

8. Sports hydration apparatus as claimed in claim 1, wherein the electric pump is located at a distal end of the interior inlet hose portion and wherein the apparatus further comprises electrical connections between the electric pump and the electric componentry.

9. Sports hydration apparatus as claimed in claim 8, wherein the electrical connections are reticulated within a watertight conduit.

10. Sports hydration apparatus as claimed in claim 8, further comprising immersion sensors at the electric pump and wherein the operation of the pump is controlled in accordance with sensor data received via the immersion sensors.

11. Sports hydration apparatus as claimed in claim 1, wherein the electric componentry further comprises a microcontroller comprising a dispensing controller and wherein the dispensing controller is configured for controlling the operation of the pump.

12. Sports hydration apparatus as claimed in claim 11, wherein the dispensing controller is configured for controlling the operation of a pump for a predetermined period after receiving the wireless control instructions.

13. Sports hydration apparatus as claimed in claim 11, wherein the dispensing controller is configured for operating the pump at at least one of differing operational speeds and durations in accordance with differing wireless dispensing control instructions received via the wireless receiver.

14. Sports hydration apparatus as claimed in claim 1, wherein the electronic componentry further comprises a microcontroller comprising a hydration controller and wherein the hydration controller is configured for autonomous control of the pump in accordance with a fluid replenishment regime.

15. Sports hydration apparatus as claimed in claim 14, wherein the hydration controller is configured for dynamically updating the fluid replenishment regime.

16. Sports hydration apparatus as claimed in claim 15, wherein the hydration controller is configured for updating the fluid replenishment regime in accordance with variables comprising at least one of distance traveled, altitude gain, ambient temperature and biometric parameters.

17. Sports hydration apparatus as claimed in claim 16, wherein the wireless receiver is configured for pairing with a mobile computer device and wherein the hydration controller is configured for receiving the variables from the mobile communication device.

18. Sports hydration apparatus as claimed in claim 1, wherein the mouthpiece is a jet comprising an outlet for spraying water into the mouth of a user at a distance.

19. Sports hydration apparatus as claimed in claim 18, wherein the jet is configured for helmet mounting.

20. Sports hydration apparatus as claimed in claim 19, wherein the jet comprises a detachable portion comprising the outlet, the detachable portion configured for selective detachment from a helmet fixed portion.

21. Sports hydration apparatus as claimed in claim 20, wherein the jet comprises magnets for selective attachment of the detachable portion to the helmet fixed portion.

22. Sports hydration apparatus as claimed in claim 20, wherein the helmet fixed portion is configured for securement to an inner face of a helmet jaw piece and wherein the outlet of the detachable portion is orientated towards the mouth of the user.

23. Sports hydration apparatus as claimed in claim 22, wherein the helmet fixed portion is substantially elongate and comprising elastic band securement is at a distal ends thereof so as to allow the lifting of the elastic band around the helmet jaw piece for securement of the helmet fixed portion.

24. Sports hydration apparatus as claimed in claim 1, wherein the mouthpiece comprises a transmitter for sending the wireless control instructions to the wireless receiver.

25. Sports hydration apparatus as claimed in claim 24, wherein the mouthpiece comprises a tongue operated actuator operably coupled to the transmitter.

* * * * *